(12) United States Patent
Schmidt et al.

(10) Patent No.: US 7,509,752 B2
(45) Date of Patent: *Mar. 31, 2009

(54) LEVEL WITH ADJUSTABLE FASTENER LOCATORS

(75) Inventors: William Schmidt, Libertyville, IL (US); Kathleen Fisher, Lindenhurt, IL (US); Jeffrey A DeBoer, Ann Arbor, MI (US); Michael Nellenbach, Clawson, MI (US)

(73) Assignee: The Faucet Queens, Inc., Vernon Hills, IL (US)

( * ) Notice: Subject to any disclaimer, the term of this patent is extended or adjusted under 35 U.S.C. 154(b) by 43 days.

This patent is subject to a terminal disclaimer.

(21) Appl. No.: 11/678,842

(22) Filed: Feb. 26, 2007

(65) Prior Publication Data

US 2007/0144020 A1 Jun. 28, 2007

Related U.S. Application Data

(63) Continuation of application No. 10/992,392, filed on Nov. 18, 2004, now Pat. No. 7,210,243.

(51) Int. Cl.
  *G01D 21/00* (2006.01)
(52) U.S. Cl. .......................................... 33/613; 33/374
(58) Field of Classification Search .................. 33/613, 33/370, 379, 374, 758
  See application file for complete search history.

(56) References Cited

U.S. PATENT DOCUMENTS

| 2,570,430 | A | 10/1951 | Cramer |
|---|---|---|---|
| 4,394,799 | A | 7/1983 | Moree et al. |
| 5,103,569 | A | 4/1992 | Leatherwood |
| 5,103,573 | A | 4/1992 | Ehling et al. |
| 5,167,075 | A | 12/1992 | Weldy et al. |
| 5,577,327 | A | 11/1996 | Archambault |
| 5,806,196 | A | 9/1998 | Gibbs et al. |
| 6,029,362 | A | 2/2000 | Miodragovic |
| 6,032,378 | A | 3/2000 | Null |
| 6,047,478 | A | 4/2000 | Sowers |
| 6,049,991 | A | 4/2000 | Gruenberg et al. |
| 6,148,529 | A | 11/2000 | Kennedy |
| 6,279,240 | B1 | 8/2001 | Bonaventura |
| 6,293,023 | B1 | 9/2001 | Schooley |
| 6,305,092 | B1 | 10/2001 | Tufariello |
| 6,305,093 | B1 | 10/2001 | Venola |
| 6,357,716 | B1 | 3/2002 | Kratish et al. |
| 6,409,140 | B1 | 6/2002 | Kratish et al. |
| 6,471,175 | B1 | 10/2002 | Kratish et al. |
| 6,473,983 | B1 | 11/2002 | Gier |
| 6,578,812 | B2 | 6/2003 | Lemire |
| 6,782,628 | B2 | 8/2004 | Liao |
| 6,785,977 | B1 | 9/2004 | Crichton |
| 2002/0078583 | A1 | 6/2002 | Richardson |
| 2003/0005589 | A1 | 1/2003 | Hale et al. |
| 2006/0174504 | A1* | 8/2006 | Szumer et al. ................ 33/613 |

* cited by examiner

*Primary Examiner*—Yaritza Guadalupe-McCall
(74) *Attorney, Agent, or Firm*—Cohen & Grigsby, P.C.

(57) ABSTRACT

A level assembly includes a housing having a level mounted within. The housing includes a first arm and a second arm slidably attached to the housing. The first and second arms are both stored in storage positions. Fastener locators associated with each arm are both stored in storage positions. During use the fastener locators are pivoted to an extended position.

17 Claims, 7 Drawing Sheets

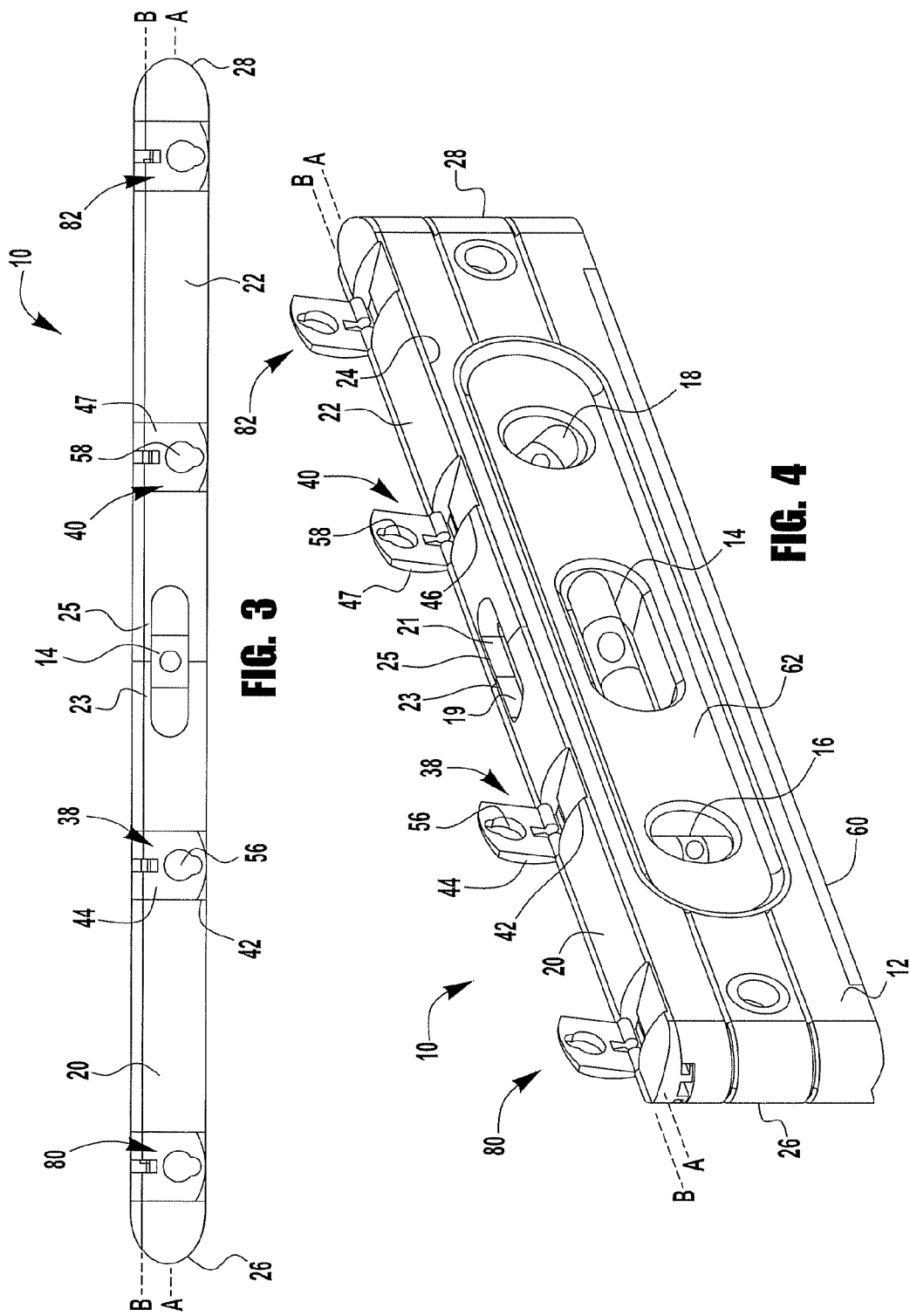

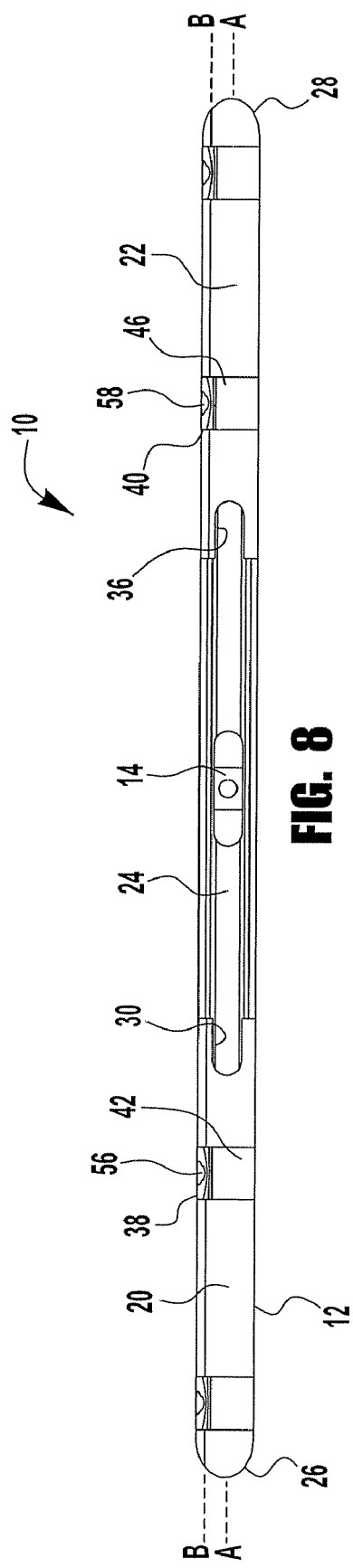

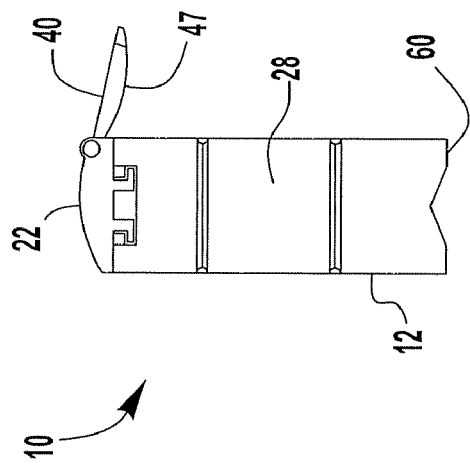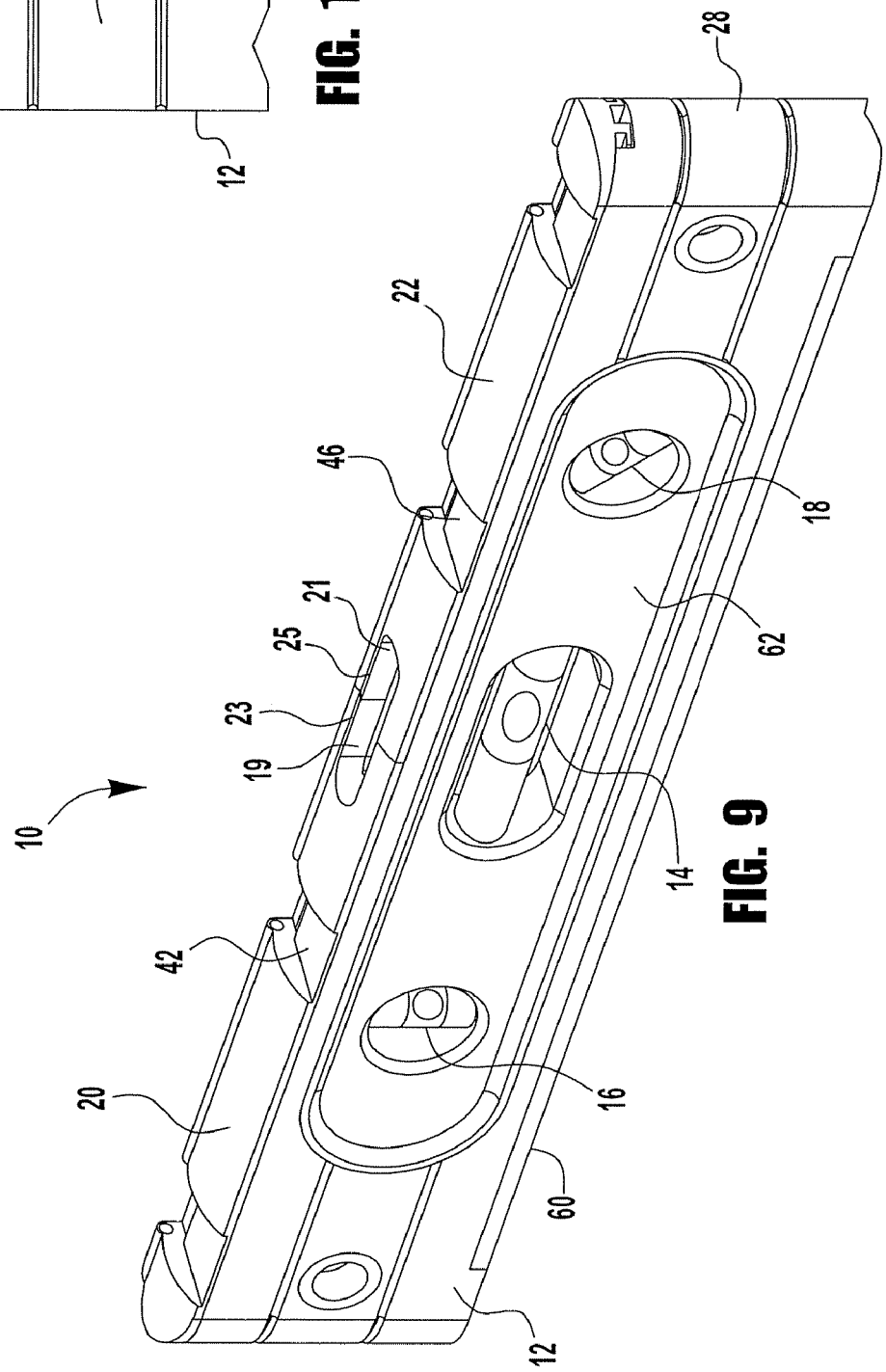

LEVEL WITH ADJUSTABLE FASTENER LOCATORS

REFERENCE TO RELATED APPLICATION

This application claims priority to and is a continuation-in-part of U.S. application Ser. No. 10/992,392, filed Nov. 18, 2004.

BACKGROUND OF THE INVENTION

The present invention is a level and more particularly a level having slidable arms with adjustable fastener locators for simultaneously designating a multiple of fastener locations.

In order to hang an object on a wall, all of the locations for the fasteners that mount the object must be precisely marked. Various devices that assist in marking the fastener positions are known. Conventional devices include levels that have indicators for marking the distance between the fasteners. However, simultaneously marking multiple fastener locations in a level position and at a desired separation distance may be relatively difficult utilizing conventional level devices.

Conventional level devices that mark multiple locations at one time may be relatively large and awkward devices. These conventional level devices may be difficult and inconvenient to store and use for most common household tasks.

Thus, a compact device that assists in hanging and leveling objects that use multiple fasteners is needed.

SUMMARY OF THE INVENTION

The present invention provides a level assembly including a housing having a level mounted within. A first arm and a second arm interface with the housing along a first axis. The first arm and the second arm are slidably attached to the housing to move along the first axis relative to the housing. Each arm has a fastener locator that is aligned with a corresponding fastener on the picture or object. The fastener locators are then used to locate the appropriate position for the fasteners on the wall.

The fastener locators are mounted to the arms to pivot about a second axis between a storage position and an extended position. Optionally, fastener locators pivot approximately 20 degrees past horizontal. The fastener locators each have an aperture to guide a marking device to pass through for marking a fastener location when hanging an object.

In use, the fastener locators are pivoted to an extended position. Each arm has an indent in which the fastener locators are retained. The indent is located along a second axis such that the fastener locators can be easily aligned to assist with hanging objects. In an alternative embodiment, fastener locators can be inserted and removed from said intends. To mark relatively greater distances between fasteners the first and second arms are extended by sliding them along the first axis relative to the housing. For storage the arms are retracted and the fastener locators are returned to the storage positions.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is a view of the top side of the leveling device of an embodiment of the present invention;

FIG. 4 is a general view of an embodiment of the leveling device where the fastener locators are in an extended position;

FIG. 8 is a top plan view of an embodiment of the present invention showing first arm and second arm in extended positions;

FIG. 9 is a general view of an embodiment showing the leveling device of the present invention without fastener locators; and FIG. 10 is a view of a side of one leveling device of an embodiment of the present invention.

DETAILED DESCRIPTION OF THE PREFERRED EMBODIMENT

Figure 1:
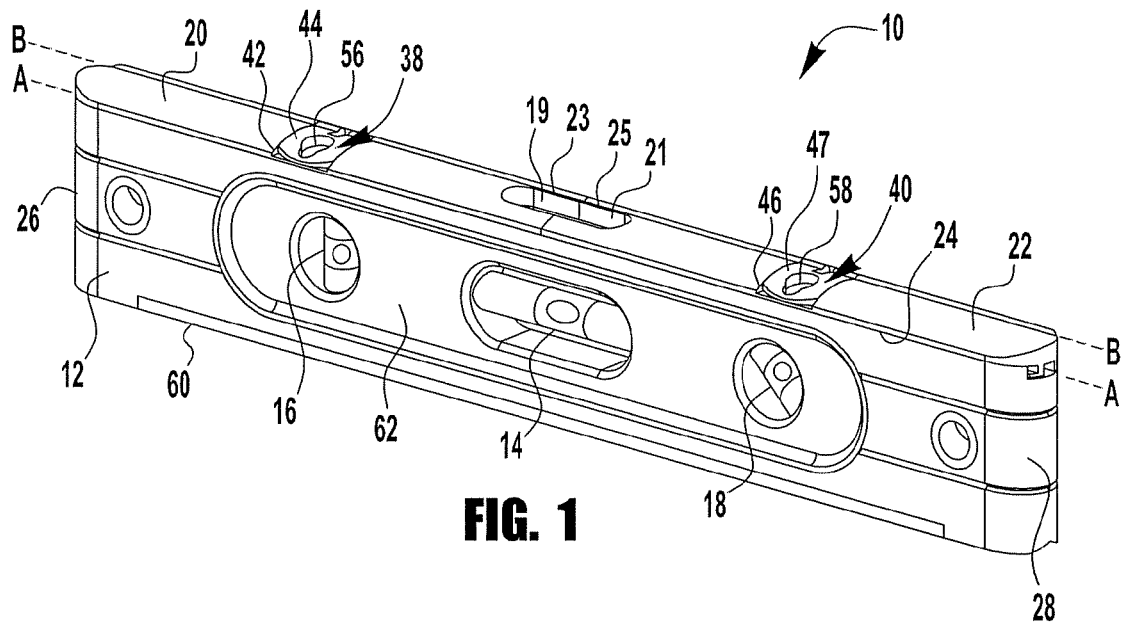
FIG. 1 is a general view of the leveling device of an embodiment of the present invention.

FIG. 1 illustrates a level assembly 10 which includes a housing 12 that defines a first axis A. Mounted within the housing 12 is a level 14. The level 14 is parallel to the first axis A. Additional levels 16 and 18 may correspond to other axes such as an axis perpendicular to the first axis A.

The level assembly includes a first arm 20 and a second arm 22. The first aim is located on a top side 24, adjacent a first end 26 of the level assembly 10. The second arm 22 is also located on the top side 24 of the level assembly 10. The second arm 22 is located adjacent a second end 28. When in a retracted position the first arm 20 preferably does not extend beyond the first end 26. Likewise, when in a retracted position the second arm 22 does not extend beyond the second end 28.

The first arm 20 and the second arm 22 interface with the housing 12 along the first axis A. The first arm 20 is attached to the housing 12 such that the first arm 20 is moveable relative to the housing 12 along the first axis A.

Figure 2:
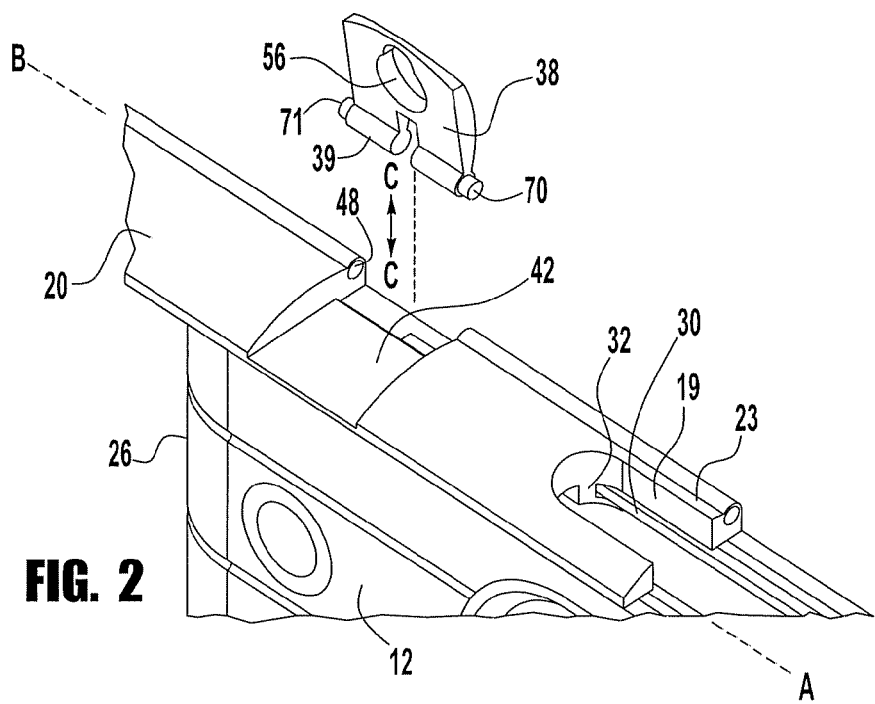
FIG. 2 is a perspective view of one embodiment showing the interface between the first arm having a removable fastener locator and the housing of the leveling device.

FIG. 2 shows one embodiment of the first arm 20 where the interface is a tongue 30 formed in the housing 12. The tongue 30 defines the first axis A. A first groove 32 extends from the first arm 20. The first groove 32 fits about the tongue 30 such that the first groove 32 can slide along the tongue 30. Applying force to the first arm 20 causes the first groove 32 to slide along the tongue 30 and the first arm 20 to move relative to the housing 12. An indentation 19 adjacent to a center section 23 of the first arm 20 allows for axial force to be applied to the first arm 20 along the first axis A. The second arm 22 is attached in a similar manner such that it is movable along the first axis A relative to the housing 12.

Figure 5:
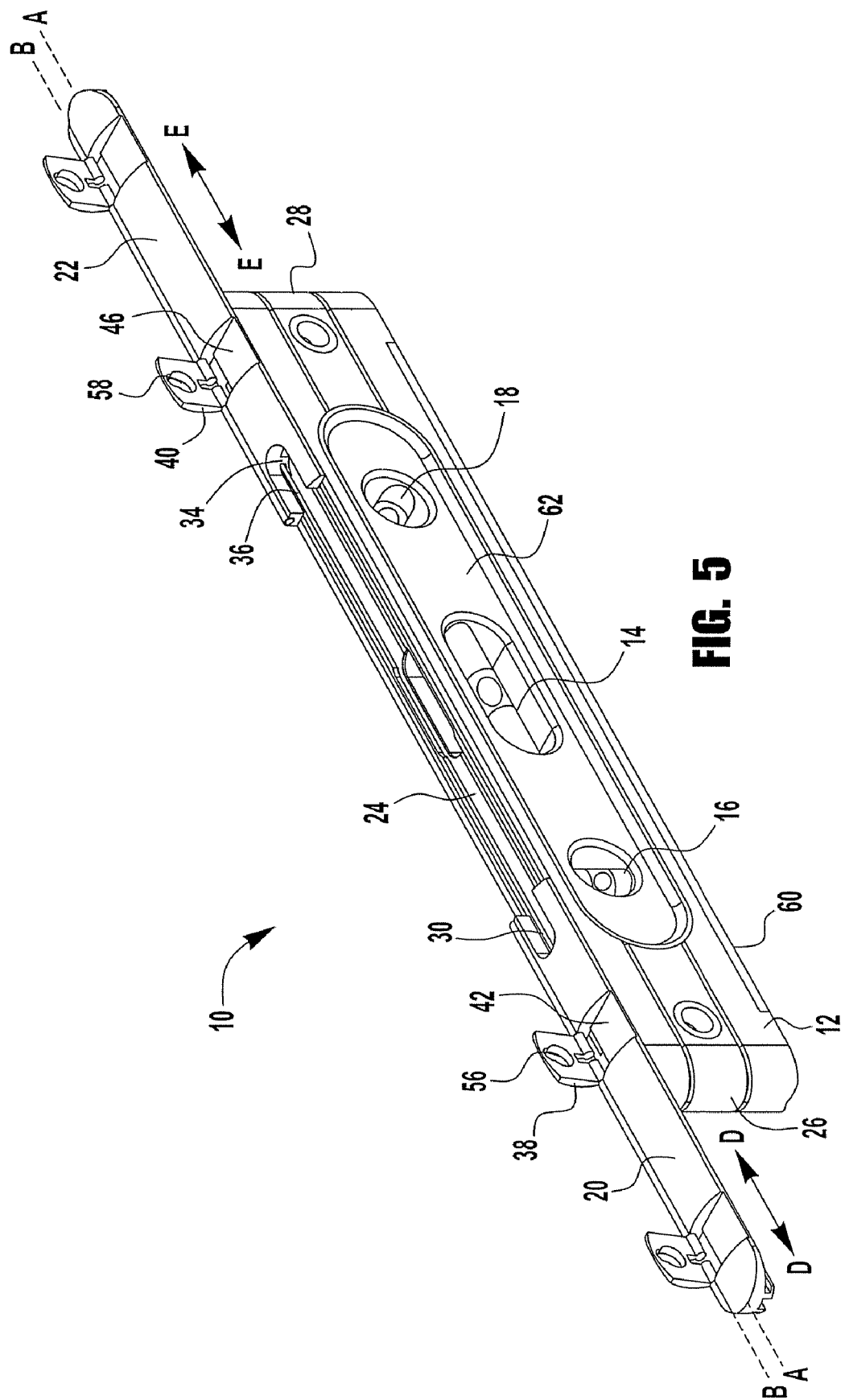
FIG. 5 is a general view of one embodiment of the leveling device where the arms and fastener locators are in extended positions.

The second arm 22 includes a second groove 34 similar to the first groove 32. The second groove 34 corresponds to tongue 36 in the housing 12 as shown in FIG. 5. An indentation 21 adjacent to a center section 25 of the second arm 22 allows for axial force to be applied to the second arm 22 along the first axis A. Additionally, the indentations 19 and 21 allow the level 14 to be seen from the top of the housing 12. Other types of interfaces that permit the first arm 20 and the second arm 22 to move relative to the housing 12 may additionally or alternatively be used. In this embodiment, the first arm 20 and the second arm 22 slide between a storage position and an extended position (FIG. 5).

The first arm 20 includes a first fastener locator 38. The second arm 22 includes a second fastener locator 40. The first fastener locator 38 and second fastener locator 40 are movable between storage positions (FIG. 1) and extended positions (FIG. 5). The first fastener locator 38 fits within a first recess 42 defined in the first arm 20 such that a first side 44 of the first fastener locator 38 is relatively level with the first arm 20. When in the storage position the second fastener locator 40 fits within a second recess 46 defined in the second arm 22 such that a first side 47 of the second fastener locator 40 is relatively with the second arm 22. The first recess 42 is formed by a separation between the first arm 20 and the center section 23. Likewise the second recess 46 is formed by a separation between the second arm 22 and the second center section 25.

The first arm 20 has a first indent 48 in which the first fastener locator 38 is retained. The first indent 48 defines the second axis B about which the first fastener locator 38 is pivotable. The second axis B is parallel to the first axis A. The first fastener locator 38 has an engagement member 39 that corresponds to the indent 48. The engagement member 39 has a cylindrical shape such that the first fastener locator 38 is rotatably retained within the indent 48. The cylindrical shape of the engagement member 39 permits the first fastener locator 38 to pivot about a second axis B between the storage position in first recess 42 and extended position. Engagement member 39 can have tabs 70 and 71 to permanently retain fastener locator within indent 48. In an alternative embodiment, tabs 70 and 71 are release tabs 70 and 71 that enable the first fastener locator to removably insert within the indent 48, illustrated for example by reference arrow C-C in FIG. 2. Release tabs 70 and 71 are pinched together for inserting and removing first fastener locator 38 from first arm 20. It should be understood that other mechanisms may be utilized for fixidly or removably retaining the first fastener locator 38 within indent 48.

The second arm 22 has a second indent 52 in which the second fastener locator 40 is pivotally retained in a similar maimer. The second indent 52 is parallel with the first indent 48 such that the second fastener locator 40 is also rotatably retained about the second axis B. Similarly, second fastener locator 40 has an engagement member that permits its removal from second arm 22.

FIG. 3 illustrates a top view of the level assembly 10 in a storage position. The first fastener locator 38 defines a first aperture 56 and the second fastener locator 40 defines a second aperture 58. In this embodiment both apertures have a keyhole shape. The first aperture 56 and second aperture 58 allow a marking device to pass through for marking a fastener location when hanging an object. Alternatively, such as for use in marking hanging items having relatively greater distances between hanging means, first fastener locator 38 and second fastener locator 40 can be exchanged with fasteners having different shapes, dimensions and aperture designs as appropriate or desired by the user.

In another embodiment shown for example in FIGS. 3 and 4, first arm 20 includes an outer first fastener locator 80 similar to the first fastener locator 38. The second arm 22 includes an outer second fastener locator 82 similar to the second fastener locator 40. Both outer first fastener locator 80 and outer second fastener locator 82 are removably attachable and moveable relative to housing 12 in a similar manner as first fastener locator 38 and second fastener locator 40. In this embodiment, both locators 80 and 82 also contain apertures having a keyhole shape.

Referring to FIG. 4 the first fastener locator 38 and the second fastener locator 40 are mounted to pivot about the second axis B between a storage position and an extended position (FIG. 5). The first fastener locator 38 and the second fastener locator 40 can rotate about 14 to 90 degrees past horizontal. The first recess 42 in the first aim 20 defines a storage position for the first fastener locator 38 and the second recess 46 in the second arm 22 defines a storage position for the second fastener locator 40. When in the extended position, the first fastener locator 38 is removably fixed and pivotable about the first indent 48 about the second axis B. Likewise, the second fastener locator 38 operates relative to the second arm 22. As shown for example in FIGS. 5 and 8, to obtain greater distance between the fastener locaters 38, 40 the first arm 20 and the second arm 22 are slidable along the first axis A (Arrows D-D and arrows C-C; FIG. 5) for positioning the first fastener locator 38 and the second fastener locator 40 for marking an appropriate distance location.

Figure 6:
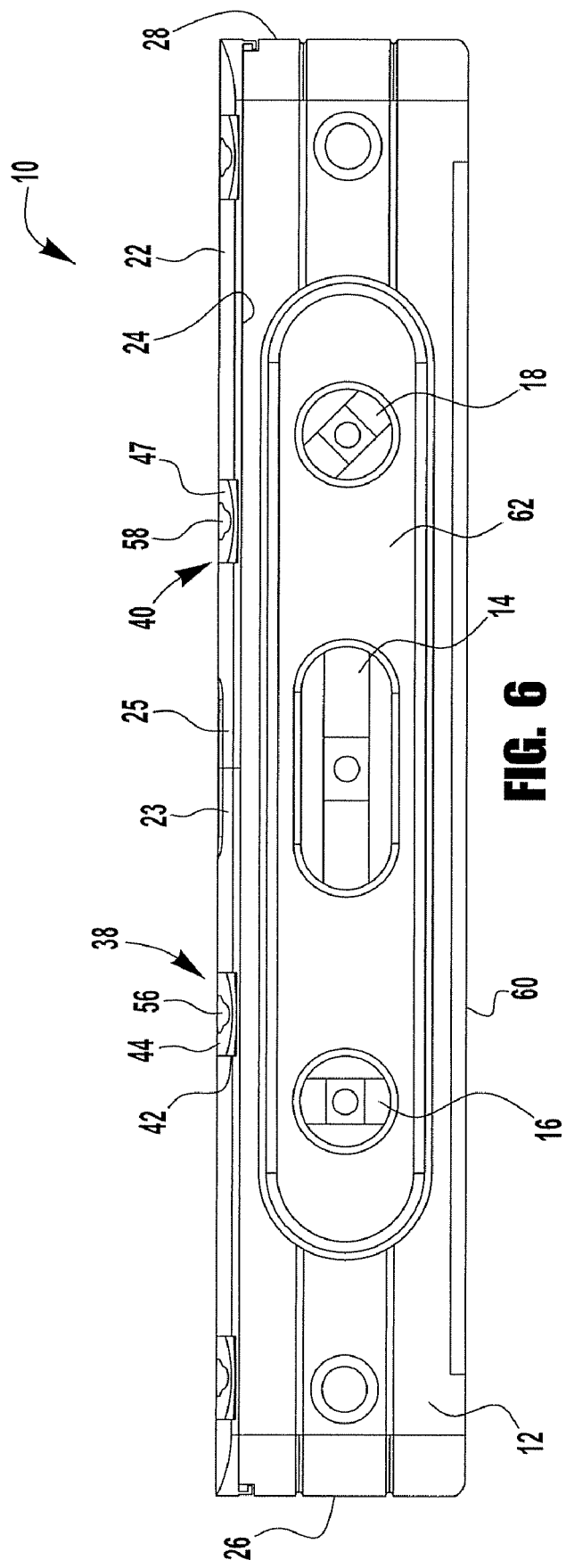
FIG. 6 is a general view of the front of an embodiment of the leveling device of the present invention.
Figure 7:
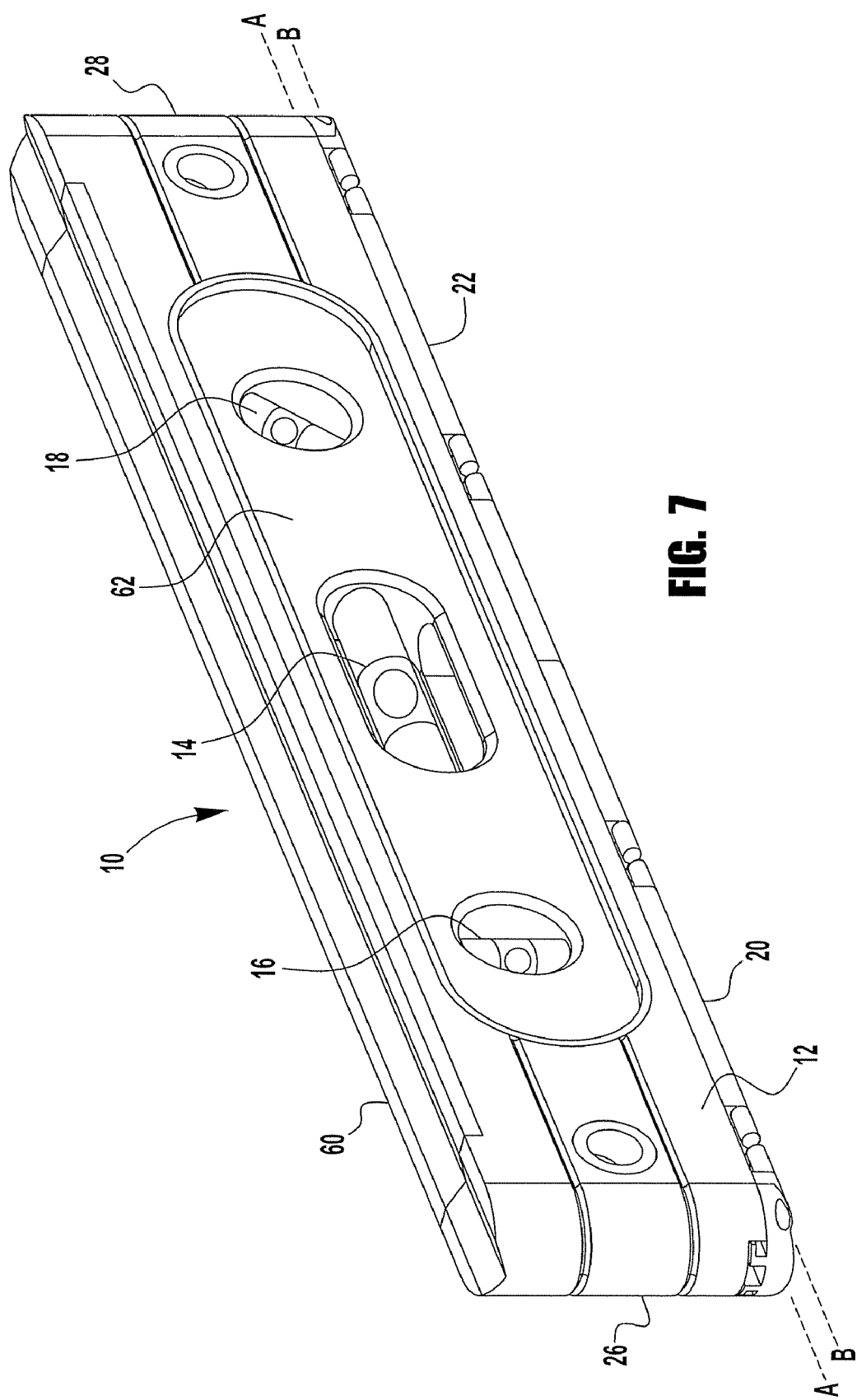
FIG. 7 is a perspective view of one embodiment showing an indented surface on the bottom side of leveling device.

FIGS. 6 and 7 illustrate further features of an embodiment of the leveling device. Bottom portion 60 has an indented surface generally having a contour in the shape of a letter "W". Bottom portion 60 can be designed to rest on an edge surface to assist in stabilizing and leveling the device. Further, bottom portion 60 can be made of the same material as first arm 20, second arm 22 and top side 24. The construction is metal in an example. Optionally, topside 24 and bottom portion 60 are provided in one uniform part or two parts connected by a web member that extends between top and bottom of device 10.

Retaining piece 62 fits within a central portion of housing 12. Piece 62 can provide indicia and/or further secure levels 14, 16 and 18. For example, piece 62 comprises two slot-shaped engaging parts that together secure levels 14, 16 and 18 by holding them in place within housing 12.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A level assembly comprising:
   a housing which defines a first axis;
   a level mounted within said housing;
   a first arm moveable relative to said housing along said first axis;
   a second arm moveable relative to said housing along said first axis;
   a first fastener locator moveable relative to said housing with said first arm and also movable relative to said first arm; and
   a second fastener locator moveable relative to said second arm.

2. The assembly of claim 1, wherein said first arm is slidably mounted to said housing.

3. The assembly of claim 1, wherein an interface between said housing and said first arm is a tongue and groove.

4. The assembly of claim 1, wherein said first arm and said second arm move independently from one another.

5. The assembly of claim 1, wherein said first fastener locator defines a keyhole aperture.

6. The assembly of claim 1, wherein said first axis is defined by an interface between said first arm and said housing.

7. The assembly claim 1, wherein said first fastener locator and said second fastener locator pivot about a second axis parallel to said first axis.

8. The assembly of claim 7, wherein said second axis is defined by said first arm.

9. The assembly of claim 7, wherein said first fastener locator and said second fastener locator pivot about said second axis.

10. The assembly of claim 9, wherein said first fastener locator and said second fastener locator pivot about said second axis between an extended and storage position.

11. The assembly of claim 10, wherein said first arm defines a recess to receive said fastener locator in said storage position.

12. The assembly of claim 9, wherein said storage position is parallel to said first arm and said extended position is perpendicular to said first arm.

13. The assembly of claim 1, wherein said first fastener locator and said second fastener locator are removably mounted in an indent within said housing parallel to said second axis.

14. The assembly of claim 1, wherein said first fastener locator and said second fastener locator rotate about 14 to 90 degrees past horizontal about the second axis.

15. The assembly of claim 1, further including a third fastener locator moveable relative to said first arm.

16. The assembly of claim 1, wherein said first arm and said second arm each have at least two fastener locators movable relative thereto.

17. The assembly of claim 1, wherein said housing has an indented bottom portion.

* * * * *